No. 860,541. PATENTED JULY 16, 1907.
C. H. HAPGOOD.
SCALE.
APPLICATION FILED NOV. 21, 1905.
3 SHEETS—SHEET 1.
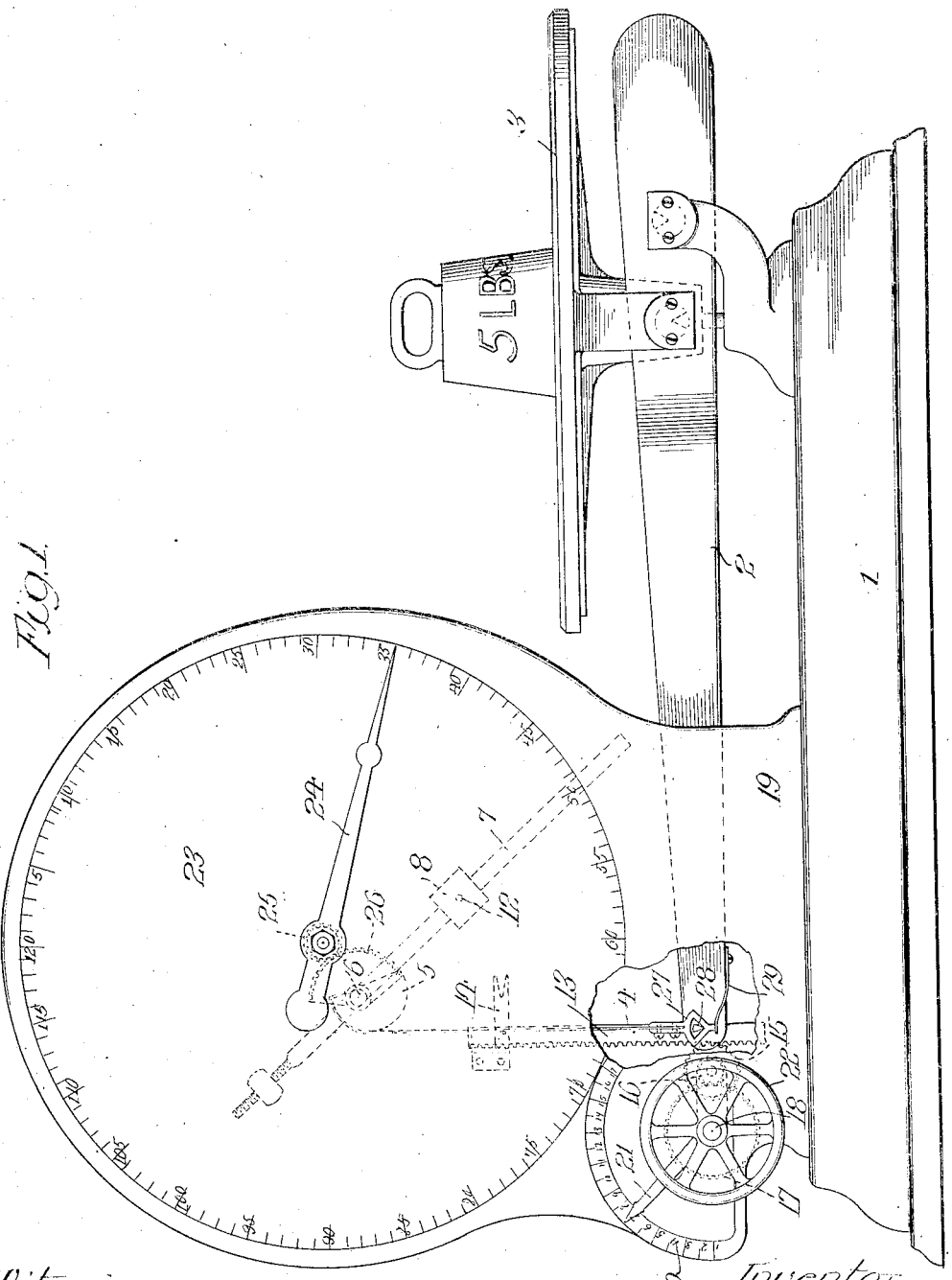

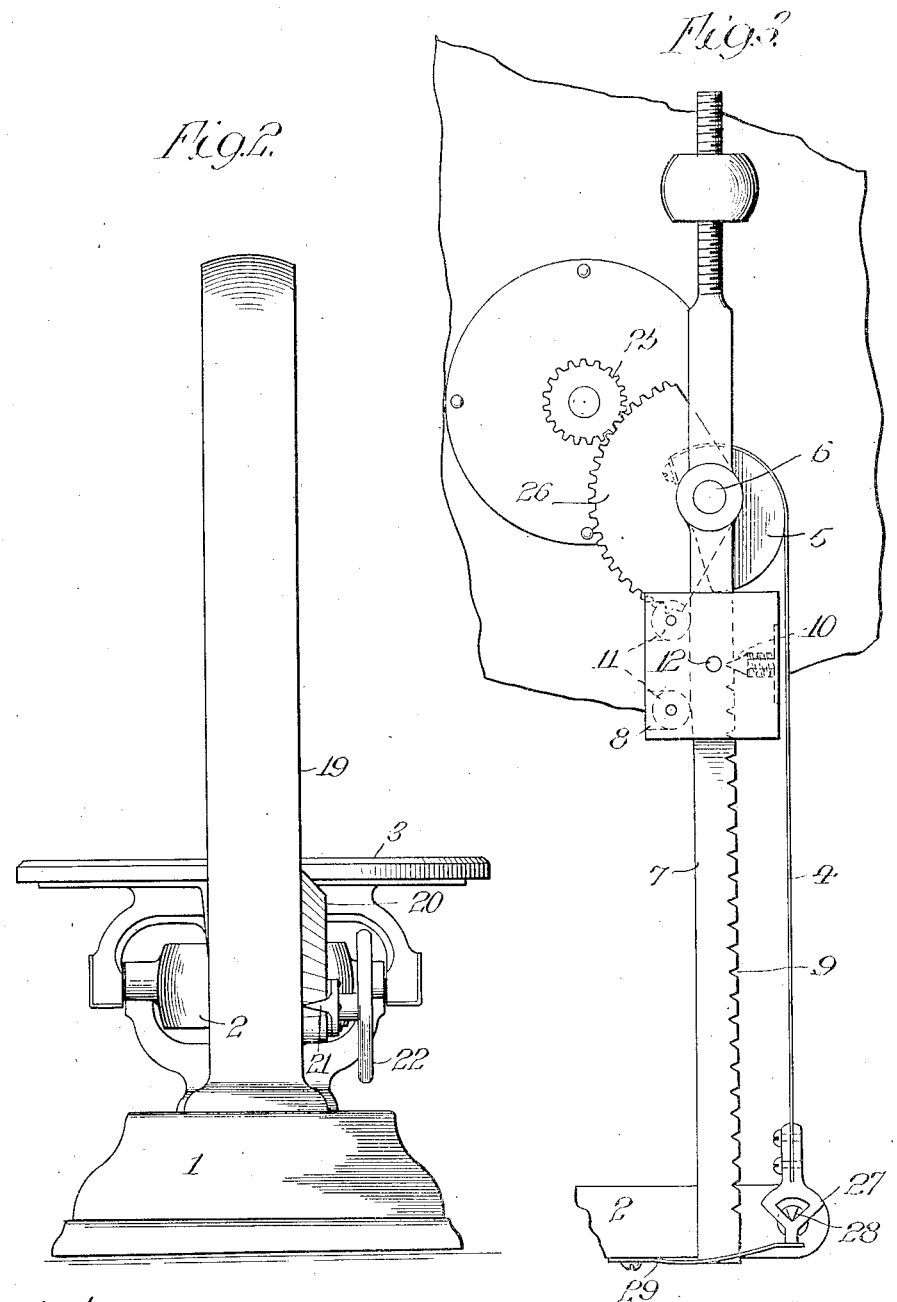

No. 860,541. PATENTED JULY 16, 1907.
C. H. HAPGOOD.
SCALE.
APPLICATION FILED NOV. 21, 1905.

3 SHEETS—SHEET 3.

Witnesses
Edw. R. Barrett
Louis B. Erwin

Inventor
Clarence H. Hapgood
By Rector & Kibben
His Attys.

UNITED STATES PATENT OFFICE.

CLARENCE H. HAPGOOD, OF TOLEDO, OHIO, ASSIGNOR TO TOLEDO COMPUTING SCALE COMPANY, OF TOLEDO, OHIO, A CORPORATION OF NEW JERSEY.

SCALE.

No. 860,541.  Specification of Letters Patent.  Patented July 16, 1907.

Application filed November 21, 1905. Serial No. 288,346.

*To all whom it may concern:*

Be it known that I, CLARENCE H. HAPGOOD, a citizen of the United States, residing at Toledo, Lucas county, Ohio, have invented certain new and useful Improvements in Scales, of which the following is a specification.

My invention relates to that class of scales commonly known as computing scales, in which the price of an article at any given price per pound or other unit of weight may be indicated.

The object of my invention is to produce a computing scale in which a single series of price totals are provided but capable of indicating the value of an article at any given price per unit of weight, such result being accomplished in the present instance by imparting greater or less resistance to the counterbalancing mechanism as determined by the operator according to the price per unit of weight.

In the present instance, my invention is shown embodied in a computing scale of the pendulum type and to attain the result above stated mechanism is provided under the control of the operator for varying or adjusting the pendulum weight on its rod by moving such pendulum weight towards or away from the axis or oscillation of the pendulum.

The various features of advantage and utility in my new construction and arrangement of scale will be apparent from the description hereinbefore given.

Figure 4:
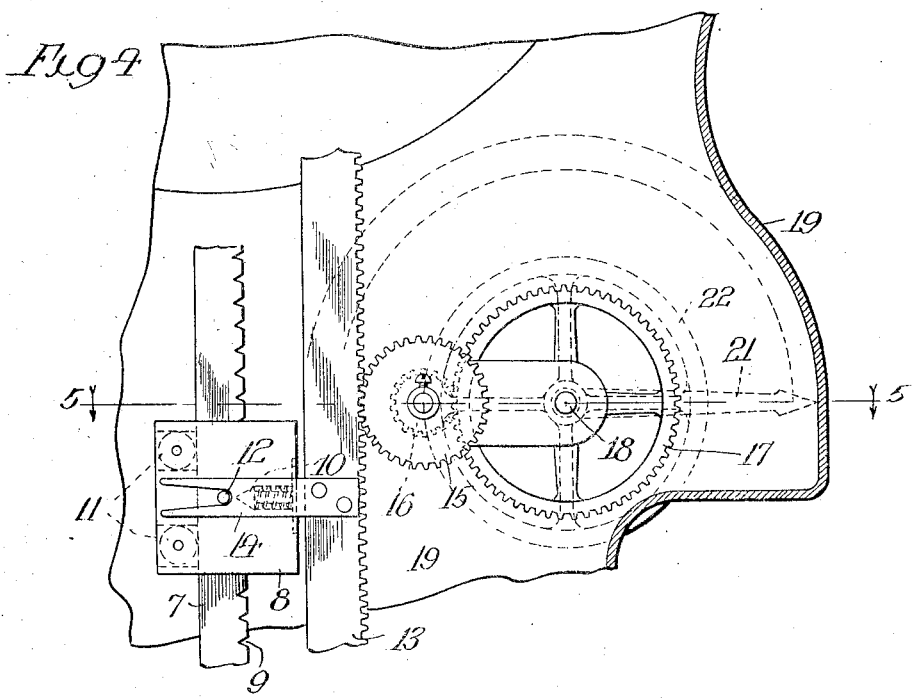
Figure 5:
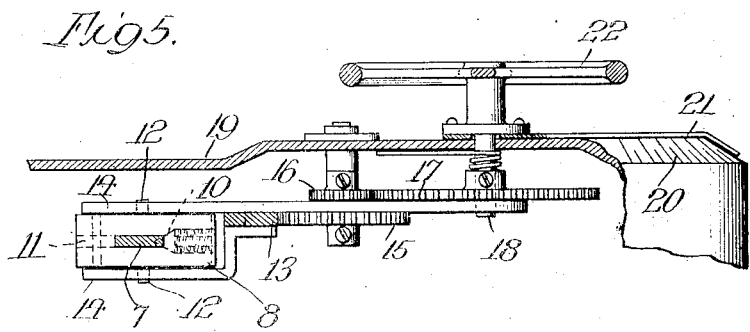

In the drawings, Figure 1 is a side elevation of one embodiment of my invention with a portion of the housing broken away to expose certain parts therewithin; Fig. 2 an end elevation of my scale; Fig. 3 an elevation of the pendulum and associated parts, such parts being drawn on a larger scale than in Figs. 1 and 2 and being full size; Fig. 4 a side elevation of a portion of the pendulum and the mechanism for actuating or adjusting the position of the pendulum weight on its rod; and Fig. 5 a section on the line 5—5 of Fig. 4.

The scale herein illustrated and described represents one embodiment of my invention although, as will be understood, changes may be made in such construction without departing from the spirit and scope of my invention and claims.

As herein shown, the scale comprises a base 1 which is mounted in the usual and well known manner a scale lever 2, on which is pivoted the usual platform 3. One end of the scale lever is operatively connected by means of the link or strap 4 with the pendulum device which, in the present instance, comprises the head or disk 5 upon which the strap bears and which is mounted on or secured to the axis or shaft 6. The pendulum rod 7 depends from the head 5 and oscillates on the axis 6 and is provided with a pendulum weight 8 which coöperates with the pendulum rod and is arranged to be adjusted longitudinally thereof in a novel manner as hereinafter set forth.

As shown more particularly in Figs. 1, 3, and 4 the pendulum rod is provided on one edge with a series of rack teeth 9, while the pendulum weight which slides longitudinally of the pendulum rod is provided with an opening to receive the rod and is also provided with a spring pressed pin or block 10 adapted to be projected inwardly towards the rack teeth 9 of the pendulum rod, with the result that the pendulum weight may be held or retained in adjusted positions upon its rod with a yielding pressure, it being understood that the pin or block 10 is beveled so that it may be easily displaced from engagement with the rack teeth upon the application of positive pressure on the pendulum weight tending to move such weight in one direction or the other.

By preference I provide within the body of the pendulum weight a pair of rollers or idlers 11 suitably journaled therein and arranged to bear against the outer edge of the pendulum rod—in the present instance, the edge opposite that which is provided with the rack teeth. In addition the pendulum weight is provided with laterally extending pins or studs 12 on two of its opposite sides for the purpose of forming a means of engagement for the mechanism which operates the pendulum weight and adjusts the same longitudinally upon its rod according to the price per pound or other unit of weight at which any particular article is sold. In the present instance, the mechanism for adjusting or moving the pendulum weight longitudinally on its pendulum rod comprises a substantially vertical bar or rack 13 provided with a frame in the form of laterally projecting plates 14, which are arranged parallel and on either side of the pendulum weight which is herein shown as rectangular in cross section. These plates which are in the nature of fingers are forked at their free ends and arranged to engage the laterally projecting pins 12 on the pendulum weight, with the result that when the rack 13 is raised or lowered by operating connections hereinafter described the pendulum weight will be correspondingly moved up or down as the case may be, it being understood that the pendulum is free to oscillate without any interference from said mechanism, as is clearly made apparent in Figs. 1 and 4. In the present instance, the operating connections for raising and lowering the rack comprises a train of gears 15, 16 and 17, the latter of which is secured to a horizontal shaft or spindle 18 having bearings in the housing 19 which rises from the base of the scale and contains the working parts now being described, including the pendulum and one end of the scale lever.

In order to enable the operator or salesman to move the rack 13 to any predetermined position according to any price per unit of weight, I provide a graduated scale 20 located on one side of the housing and having graduations representing different prices per unit of weight. In addition I provide a suitable indicator, such as the pointer 21 coöperating with the graduations on the scale and secured to the shaft 18 or to the hub of a hand wheel 22, whereby such mechanism may be manually manipulated in a convenient manner.

It will be understood that when the hand wheel 22 is turned in one direction or the other the rack 13 is raised or lowered according to the direction of rotation of the hand wheel and the pendulum weight is likewise raised or lowered on its rod as the case may be for the purpose of offering more or less resistance to the scale lever and to the price indicating device now to be described. In this connection it may be noted that for lower-priced articles the pendulum weight is positioned further from the axis of oscillation of the pendulum than for higher-priced articles.

The indicating mechanism employed for the purpose of indicating the value of the article comprises a chart 23 herein shown as circular in form and supported towards the upper portion of the housing 19. Instead of having a plurality of series of price totals as is ordinarily the case in computing scales, this chart is provided with a single set or series of price totals which are arranged to indicate the price total of an article at any given price per unit of weight, it being understood that this result is obtainable, that is the value of an article at any given price per unit of weight may be indicated by the employment of a single series of price totals, by reason of the provision of the mechanism hereinbefore described for governing the amount of resistance offered by the pendulum as determined by the price per unit of weight to which said mechanism is manually adjusted by the operator or salesman. This chart may have any number of graduations and may be for any desired capacity, as determined by the construction of the other parts of the scale, such chart in the present instance being capable of computing as high as $1.20.

An indicator or pointer 24 coöperates with the chart and is arranged to sweep over the face thereof for the purpose of indicating the value of the article. This pointer is operatively connected with the pendulum axis or shaft 6 in suitable manner and in the present instance such operating connection consists of gearing, the pointer being provided with a pinion 25 with which meshes a segmental gear 26, secured to the shaft 6.

In practice the article whose value is to be computed is placed upon the platform 3 and the pointer 21 is adjusted to indicate the price per pound or other unit of weight at which the article is sold. For example, we will assume that the article weighs five pounds and that the price thereof is seven cents per pound. Assuming that the pointer 21 has been adjusted to indicate "7" on the scale 20, the indicator 24 will move from its zero position to exactly 35 when the article is placed on the platform, as shown in Fig. 1, thereby indicating that the value of the article according to the present example is thirty-five cents. Assuming that the pointer 21, before said adjustment as just described, was indicating a lower price per pound than seven cents, say one cent per pound, the pendulum weight, at that time, was near its lowermost position on its rod, that is near the lower end thereof, with its pins 12 postioned within the slotted or forked ends of the raising and lowering plates or fingers 14, provided that no load was upon the platform but with the pendulum hanging vertically. When the pointer 21 is moved from said position to a position to indicate 7, according to the said example, the rack 13, together with said fingers 14 is raised and the pendulum weight is also raised to the same extent so that the scale is now in condition to compute the value of articles at 7¢ per pound, it being understood, as hereinbefore described, that the pendulum weight is retained by its spring pressed pin 10 to any position to which it may be adjusted.

The connection between the strap or link 4 and the scale lever is by preference constructed as indicated in Figs. 1 and 3, according to which construction the stirrup 27 is held against the knife edge bearing 28 on the scale lever with a yielding pressure by means of the spring 29, secured at one end to the underside of the scale lever and bearing with its other end against the stirrup.

It will be understood that my scale may be employed as a weighing scale indicating the weight of the article by setting the indicator pointer 21 to proper position, as for instance to the indication 16, when the weight will be computed in pounds and ounces on the chart.

I claim:

1. In a pendulum scale, the combination, with the pendulum thereof, and its weight, of stationarily located mechanism coöperating with such weight and arranged to shift the same according to the price of the article per unit of weight.

2. In a pendulum scale, the combination, with the pendulum weight, of stationarily located mechanism under the control of the operator for moving such weight towards or away from its axis of oscillation according to the price of the article per unit of weight.

3. In a pendulum scale, the combination with a computing device having a single series of price totals and with the pendulum weight, of stationarily located mechanism for controlling the position of the weight relatively to its axis of oscillation according to the price of the article per unit of weight.

4. In a pendulum scale, the combination, with the pendulum weight and its rod, of stationarily located mechanism for moving such weight on the rod according to the price of the article per unit of weight.

5. In a pendulum scale, the combination, with a pendulum weight movable towards or away from its axis of oscillation, of a chart indicating different prices per unit of weight, a movable indicator arranged to coöperate with such chart, and operating connections between said indicator and the pendulum weight.

6. In a pendulum scale, the combination, with a pendulum rod, of a weight movable longitudinally thereof and held in adjusted positions with a yielding pressure, and stationarily located mechanism for moving such weight on the rod according to the price of the article per unit of weight.

7. In a pendulum scale, the combination, with a pendulum rod, of a weight movable longitudinally on the rod, means carried by the weight for engaging the rod to cause the weight to be held at different adjusted positions, and stationarily located mechanism for moving such weight on the rod according to the price of the article per unit of weight.

8. In a pendulum scale, the combination, with a pendulum rod, of a weight movable longitudinally on the rod, means carried by the weight for engaging the rod to cause the weight to be held at different adjusted positions, comprising a spring pressed block mounted in such weight and held projected against the pendulum rod, and stationarily located mechanism for moving such weight on the rod according to the price of the article per unit of weight.

9. In a pendulum scale, the combination, with a pendulum rod having a series of rack teeth, of a weight movable longitudinally on the rod, means carried by the weight for engaging said teeth with a yielding pressure, and mechanism for moving such weight on the rod according to the price of the article per unit of weight.

10. In a pendulum scale, the combination, with a pendulum rod having a series of rack teeth on one edge, of a weight having an opening to receive the pendulum rod whereby the former may be moved on the latter to different distances from the axis of oscillation of the pendulum rod, said weight having a side recess, a spring pressed block or pin arranged in said recess and projected against said rack teeth to hold the weight in adjusted position with a yielding pressure, and mechanism for moving such weight on the rod according to the price of the article per unit of weight.

11. In a pendulum scale, the combination, with the pendulum weight and its rod, of mechanism for moving such weight on the rod according to the price of the article per unit of weight, comprising a movable frame arranged to engage the pendulum weight when the pendulum is at rest, and means for moving such frame vertically distances dependent upon the price per unit of weight.

12. In a pendulum scale, the combination, with the pendulum weight and its rod, of mechanism for moving such weight on the rod according to the price of the article per unit of weight, comprising a movable frame arranged to engage the pendulum weight when the pendulum is at rest, an operating device manually operable to different positions according to the price per unit of weight, and operating connections between such frame and said device.

13. In a pendulum scale, the combination, with the pendulum weight and its rod, of mechanism for moving such weight on the rod according to the price of the article per unit of weight comprising a movable frame arranged to engage the pendulum weight when the pendulum is at rest, a manually operable indicator coöperating with a chart indicating different prices per unit of weight, and operating connections between said frame and indicator.

14. In a pendulum scale, the combination, with the pendulum weight and its rod, of mechanism for moving such weight on the rod according to the price of the article per unit of weight, comprising a movable frame arranged to engage the pendulum weight when the pendulum is at rest, a manually operable indicator coöperating with a chart indicating different prices per unit of weight, and operating connections between said frame and indicator consisting of a vertical rack on which said frame is mounted and a train of gears between such rack and the indicator.

15. In a pendulum scale, the combination, with the pendulum weight and its rod, of mechanism for moving such weight on the rod according to the price of the article per unit of weight comprising a vertically movable bar having projections adapted to engage the pendulum weight when the pendulum is at rest, and means for raising and lowering said bar and its projections at the will of the operator.

16. In a pendulum scale, the combination, with the pendulum weight and its rod, of mechanism for moving such weight on the rod according to the price of the article per unit of weight comprising a vertically movable bar, plates or fingers projecting therefrom and having forked ends, said pendulum weight having projections engaged by said forked ends, and means for raising and lowering said bar and plates at the will of the operator.

17. In a pendulum scale, the combination, with the pendulum weight and its rod, of mechanism for moving such weight on the rod according to the price of the article per unit of weight comprising a vertically movable rack bar having projections adapted to engage the pendulum weight when the pendulum is at rest, an indicator movable according to the price per unit of weight, and gearing between said rack and the indicator.

18. In a pendulum scale, the combination, with the pendulum weight and its rod, of mechanism for moving such weight on the rod according to the price of the article per unit of weight comprising a vertically movable bar having a rack on one side, gearing coöperating with the rack, fingers projecting from the bar and extending on either side of the pendulum rod and of the pendulum weight, said fingers having means of engagement with the pendulum weight in the operation of raising and lowering the weight.

19. In a pendulum scale, the combination, with the pendulum weight and its rod, of mechanism for moving such weight on the rod according to the price of the article per unit of weight comprising a vertically movable bar having a rack on one side, gearing coöperating with the rack, fingers projecting from the bar and extending on either side of the pendulum rod and of the pendulum weight, said fingers having forked ends and said weight having laterally projecting pins arranged to be received by said forked ends.

20. In a pendulum scale, the combination, with the pendulum weight and its rod, of mechanism for moving such weight on the rod according to the price of the article per unit of weight comprising a movable bar having a rack on one side, projections thereon adapted to engage the pendulum weight, and operating connections for the bar consisting of an indicator arranged to be moved according to different prices per unit of weight, a shaft on which such indicator is secured, and a train of gearing between said shaft and the rack on the bar.

21. In a pendulum scale, the combination, with the pendulum weight and its rod, of mechanism for moving such weight on the rod according to the price of the article per unit of weight comprising a movable bar having a rack on one side, projections thereon adapted to engage the pendulum weight, and operating connections for the bar consisting of a hand wheel mounted on a shaft, an indicator mounted thereon and arranged to be moved by said wheel to indicate different prices per unit of weight, and a train of gearing between said shaft and the rack on the bar.

22. In a pendulum scale, the combination, with the pendulum weight and its rod, of mechanism for moving such weight on the rod according to the price of the article per unit of weight comprising a movable bar having projections arranged to engage the pendulum weight and to raise or lower the same on its rod, and means for raising and lowering said bar, said pendulum weight being held to its rod at adjusted positions with a yielding pressure.

23. In a pendulum scale, the combination, with a chart having a single series of price totals and its indicator or pointer, of a pendulum having a rod and a weight movable longitudinally thereon, stationarily located mechanism controlled by the operator for adjusting the weight on its rod according to different prices per unit of weight, a shaft forming the axis of the pendulum, and an operating connection between the shaft and the pointer.

24. In a pendulum scale, the combination, with a chart having a single series of price totals and its indicator or pointer, of a pendulum having a rod and a weight movable longitudinally thereon, stationarily located mechanism controlled by the operator for adjusting the weight on its rod according to different prices per unit of weight, a shaft forming the axis of the pendulum, and gearing between the shaft and the pointer.

25. A computing scale comprising a chart having a single series of price totals, an indicator coöperating with such totals for indicating the value of an article at different prices per pound, a scale lever, a pendulum connected with said lever and said indicator, with provisions for varying the resistance of the pendulum according to the price per unit of weight, and stationarily located manipulative means for effecting such variation.

26. In a scale, the combination of a scale lever, a pendulum, indicating devices coöperating with the pendulum, a link connection between the lever and pendulum having a knife edge bearing comprising a yoke on the end of the link connection, a knife edge on the lever, and a spring for holding the yoke in operative connection with said knife edge with a yielding pressure.

CLARENCE H. HAPGOOD.

Witnesses:
M. L. THOMPSON,
ALLEN DE VILBISS, Jr.